United States Patent
He et al.

(10) Patent No.: US 9,794,345 B2
(45) Date of Patent: *Oct. 17, 2017

(54) SENSOR COMMUNICATION NETWORK FOR SEARCHING VIRTUAL RESOURCES

(75) Inventors: Le He, Beijing (CN); Wu Yu Hui, Beijing (CN); Xing Jin, Beijing (CN); Qing Bo Wang, Beijing (CN); Yang Zhao, Beijing (CN); Zhi Le Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 814 days.

This patent is subject to a terminal disclaimer.

(21) Appl. No.: 13/391,750

(22) PCT Filed: Aug. 19, 2010

(86) PCT No.: PCT/EP2010/062078
§ 371 (c)(1),
(2), (4) Date: Feb. 22, 2012

(87) PCT Pub. No.: WO2011/023618
PCT Pub. Date: Mar. 3, 2011

(65) Prior Publication Data
US 2012/0159483 A1    Jun. 21, 2012

(30) Foreign Application Priority Data
Aug. 28, 2009    (CN) .......................... 2009 1 0171027

(51) Int. Cl.
*G06F 9/455* (2006.01)
*G06F 9/46* (2006.01)
*H04L 29/08* (2006.01)

(52) U.S. Cl.
CPC .......... *H04L 67/12* (2013.01); *G06F 9/45558* (2013.01); *H04L 67/18* (2013.01); *G06F 2009/4557* (2013.01)

(58) Field of Classification Search
None
See application file for complete search history.

(56) References Cited

U.S. PATENT DOCUMENTS 7,135,967 B2    11/2006    Culpepper et al.
7,180,422 B2    2/2007    Milenkovic et al.
(Continued)

FOREIGN PATENT DOCUMENTS

CN    1972228 A    5/2007
CN    101013956 A    8/2007
(Continued)

OTHER PUBLICATIONS

U.S. Appl. No. 13/616,220, Sep. 14, 2012, 1 page.
(Continued)

*Primary Examiner* — Bradley Teets
(74) *Attorney, Agent, or Firm* — Stephen R. TKacs; Stephen J. Walder, Jr.; Jennifer R. Davis

(57) ABSTRACT

A mechanism is provided for searching a virtual resource in a large scale computing system environment. The virtual resource is deployed on at least one server. Each server is coupled to a sensor and communicates with the sensor. The sensors communicate with each other and consist of a communication network. Each sensor stores an identifier of a virtual resource deployed in a server connected with the sensor and the location information of the sensor itself. The mechanism receives a searching request for a virtual resource by the at least one sensor, the searching request containing an identifier of the virtual resource being searched; forwards the searching request in the communication network of the sensors; and returns a location information of a sensor storing the identifier of the virtual resource by the sensor itself.

19 Claims, 10 Drawing Sheets

(56) References Cited

U.S. PATENT DOCUMENTS

| | | | |
|---|---|---|---|
| 7,233,990 B1 | 6/2007 | Debaty et al. | |
| 7,298,626 B1 | 11/2007 | Senogles et al. | |
| 7,333,000 B2 | 2/2008 | Vassallo | |
| 7,436,303 B2 | 10/2008 | Tourrilhes et al. | |
| 7,477,163 B2 | 1/2009 | Chen et al. | |
| 7,536,255 B2* | 5/2009 | Otsuki et al. | 701/454 |
| 7,821,424 B2 | 10/2010 | Chen et al. | |
| 7,853,958 B2* | 12/2010 | Mathew | G06F 11/0712 718/1 |
| 8,117,314 B2 | 2/2012 | Croft et al. | |
| 8,190,769 B1* | 5/2012 | Shukla et al. | 709/238 |
| 8,250,572 B2* | 8/2012 | Dahlstedt | 718/1 |
| 2004/0098377 A1 | 5/2004 | Kraft | |
| 2006/0171538 A1 | 8/2006 | Larson et al. | |
| 2007/0005382 A1 | 1/2007 | Sayers | |
| 2007/0250410 A1 | 10/2007 | Brignone et al. | |
| 2008/0052387 A1* | 2/2008 | Heinz et al. | 709/223 |
| 2008/0259919 A1* | 10/2008 | Monga | 370/389 |
| 2009/0024764 A1 | 1/2009 | Atherton et al. | |
| 2009/0119303 A1* | 5/2009 | Rio et al. | 707/10 |
| 2009/0198814 A1* | 8/2009 | Oono et al. | 709/224 |
| 2009/0327345 A1* | 12/2009 | Torr | 707/104.1 |
| 2010/0125641 A1 | 5/2010 | Shelby | |
| 2013/0159399 A1* | 6/2013 | Torr | 709/203 |
| 2014/0052864 A1* | 2/2014 | Van Der Linden et al. | 709/226 |

FOREIGN PATENT DOCUMENTS

| | | |
|---|---|---|
| CN | 101505262 A | 8/2008 |
| JP | H10164643 A | 6/1998 |
| JP | 2008206025 A | 9/2008 |
| JP | 2008278478 A | 11/2008 |
| WO | WO 2005/074229 A1 | 8/2005 |
| WO | WO2008/143653 A2 | 11/2008 |

OTHER PUBLICATIONS

Brignone, Cyril et al., "Real time asset tracking in the data center", Distributed and Parallel Databases, vol. 21, Nos. 2-3, published online May 9, 2006, 21 pages.

Gilbert, Alorie, "HP developing 'smart rack' to ease data center work", marketwatch-cnet.com.com/HP+developing+%27smart+rack%27+to+ease+data+center+work/2100-1012_3-5432481.html?type=pt&part=marketwatch-cnet&tag=feed&subj=news, Oct. 29, 2004, 4 pages.

Kant, K. et al., "Enabling Location Based Services in Data Centers", IEEE Network, vol. 22, Issue 6, Nov.-Dec. 2008, pp. 20-25.

Michel, Maximilin et al., "Poster: P2P search routing concepts for mobile object tracking", Fourth Annual International Conference on Mobile and Ubiquitous Systems: Networking & Services, XP031230272, Piscataway, NJ, Aug. 6, 2007, 3 pages.

Xie, Ming, "P2P Systems Based on Distributed Hash Table", Internet Article, read.pudn.com/downloads64/ebook/226852/p2p%20systems%20based%20on%20DHT.pdf, XP002607080, Sep. 26, 2003, pp. 1-6.

Zedler, Michel et al., "Physical location awareness for enterprise IT assets", IEEE INFOCOM Workshops 2008, Phoenix, Arizona, Apr. 2008, pp. 1-6.

Office Action dated Mar. 5, 2013 for Application No. 200910171027.6, 8 pages.

Maximilian, Michel et al., "Poster: P2P Search Routing Concepts for Mobile Object Tracking", Mobiquitous 2007, Fourth Annual International Conference on Mobile and Ubiquitous Systems: Networking & Services, Aug. 10, 2007, 3 pages.

* cited by examiner

SENSOR COMMUNICATION NETWORK FOR SEARCHING VIRTUAL RESOURCES

BACKGROUND

The present invention relates to searching virtual resources, in particular, to searching virtual resources in a large scale computing system environment, e.g., a cloud computing environment.

Cloud computing is a novel style of computing in which dynamically scalable and often virtualized resources are provided as a service over the Internet. Users need not have knowledge of expertise in, or control over the technology infrastructure in the "cloud" that supports them. The majority of cloud computing infrastructure consists of reliable services delivered through data centers and built on servers with different levels of virtualization technologies. The services are accessible anywhere that provides access to networking infrastructure. Clouds often appear as single points of access for all consumers' computing needs.

FIG. 1 shows an example of a cloud computing center. In the example shown in FIG. 1, a plurality of interconnected servers 101 consist of a cloud computing center 100. A plurality of terminals 200 can access the cloud computing center 100 to get the computing services provided by the "cloud". Such cloud computing center is already widely used in commercial area. For example, Amazon Elastic Compute Cloud (also known as "EC2") is a commercial web service that allows customers to rent computers on which to run their own computer applications. EC2 allows scalable deployment of applications by providing a web services interface through which a customer can create virtual machines, i.e. server instances, on which the customer can load any software of their choice. A customer can create, launch, and terminate server instances as needed, paying by the hour for active servers, hence the term "elastic". For further details of EC2, please refer to the Amazon Web Services (AWS) provided by Amazon.co. In addition, Azure Service Platform, which is provided by Microsoft, is also a cloud computing platform that provides a wide range of internet services, Microsoft and Salesforce, etc., each provides respective cloud computing services.

A cloud computing center is often implemented by a large number of physical servers which are collectively deployed at one or more data centers and are interconnected by networks. For example, a provider providing cloud computing services may implement one cloud computing center by deploying tens of thousands of physical servers within one data center.

In the above large scale cloud computing center, it is often required to find out the location of certain physical servers or certain virtual machines. For example, when one virtual machine providing cloud computing services for users does not work, the manager will want to find out the specific location of this virtual machine. In addition, for example, when a certain physical machine does not work, the manager will also want to find out the specific location of this physical machine.

However, physical servers of a cloud computing center are often moved to be re-deployed, thus the physical servers and the virtual machines thereon will be often moved. Even if the manager carefully records the new location information after every movement of the physical servers, when the number of movements is bigger and bigger, it is still easy for the manager to make mistakes and thus lose the location information of certain physical machine. Moreover, it is also a big burden for the manager to record and update the location of every physical server, in particular, when the data center is of a very large scale, it is a mission impossible. For example, according to a report from one large data center, a significant percentage of the physical servers in this data center cannot be precisely located, though the overall cloud computing center still operates.

In the cloud computing center, not only the location of physical servers is frequently moved, the virtual machines on the physical servers are often dynamically established, moved, and merged, etc. Therefore, the locations of both physical machines and virtual machine are constantly changed, thus it is difficult to provide a satisfying location service by the means of the prior art.

For example, U.S. Pat. No. 7,180,422 discloses an asset management method and device, wherein a logical tag (L-tag) and a physical tag (P-tag) are attached to a target device in order to manage the target device. The physical tag includes the physical address information of the computer and other information, the logical tag includes the name, the IP address, etc. of the computer. RFID is used as the tag. However, the above method can merely track the physical and logical attributes of physical computers; hut cannot be applied to virtual servers and cannot provide any information of virtual servers. Further, since RFID is used for the tags, additional RFID reader is required, and the distance between the reader and RFID is limited, thus the operating distance of the above method is limited.

Further, for example, U.S. Pat. No. 7,436,303 describes a rack sensor controller operable to sense information for hardware assets housed in a rack. Each rack sensor controller has a memory storing a location of the rack and sensor information received from a plurality of sensors. At least some of the sensors include one or more RFID readers operable to read RFID tags attached to assets housed in the rack. Each rack sensor controller has a processor, which is operable to receive the sensor information and generate a message including the sensor information and the location of the rack for transmission to one or more back-end applications via a forwarder. However, in the above patent, the sensors are mounted on racks, and the locations of racks are relatively fixed and are not frequently moved. Thus this patent cannot be applied to a dynamic data computing environment where the servers are arbitrarily moved, for example, physical servers of a cloud computing center can be moved. Further, the above patent uses RFID techniques. Each REID is passive and does not have communicating or computing capabilities. Thus additional RFID reader is required, and the above device is limited by a communication distance of the RFID reader.

SUMMARY

In order to solve the technical problem in the prior art, as mentioned above, the present invention aims to provide a mechanism for searching virtual resources in a large scale computing environment (e.g. a cloud computing environment), in particular, to a mechanism for searching locations of virtual machines (VM).

One illustrative embodiment provides a method for searching a location of a virtual resource, the virtual resource being deployed on at least one server. Each server is coupled to a sensor and communicates with the sensor. The sensors communicate with each other and consist of a communication network. Each sensor stores an identifier of a virtual resource deployed in a server connected with the sensor and the location information of the sensor itself. The method comprises receiving a searching request for a virtual resource by the at least one sensor, the searching request containing an identifier of the virtual resource being searched; forwarding the searching request in the communication network of the sensors; and returning a location information of a sensor storing the identifier of the virtual resource by the sensor itself.

Another illustrative embodiment provides a method for managing locations of virtual resources in a data computing system. The data computing system comprises a plurality of servers. At least one server is deployed with a virtual resource. Each server is coupled to a sensor. The sensors consist of a communication network. The method comprises each sensor storing information of virtual resources in a server that is connected with the sensor; each sensor storing location information of this sensor; and on the basis of location information of each sensor and information of virtual resources of each sensor, displaying location information of each virtual resource.

Another illustrative embodiment provides a data computing system comprising a plurality of servers, at least one server being deployed with a virtual resource, and a plurality of sensors, each sensor being mounted on a server. Each sensor comprises a communication unit, used for communicating with communication units of other sensors so that the plurality of sensors consist of a communication network, and for receiving a searching request for a virtual resource, the searching request containing an identifier of the virtual resource; a location information calculating unit, used for calculating and storing location information of the sensor; a virtual resource information acquiring unit, used for communicating with a server where the sensor is mounted and acquiring an identifier of a virtual resource deployed on the server; a virtual resource information storing unit, used for storing the identifier of the virtual resource acquired by the virtual resource information acquiring unit; and a virtual resource information searching unit, used for searching the virtual resource information storing unit for the identifier of the virtual resource, and returning the location information calculated by the location information calculating unit if the identifier of the virtual resource is found.

Yet another illustrative embodiment provides a sensor used for being mounted on a server, the server is deployed with a virtual resource. The sensor comprises a communication unit, used for communicating with communication units of other sensors so that the sensor and other sensors consist of a communication network, and for receiving a searching request for a virtual resource, the searching request containing an identifier of the virtual resource; a location information calculating unit, used for calculating and storing location information of the sensor; a virtual resource information acquiring unit, used for communicating with a server where the sensor is mounted and acquiring an identifier of a virtual resource deployed on the server; a virtual resource information storing unit, used for storing the identifier of the virtual resource acquired by the virtual resource information acquiring unit; and a virtual resource information searching unit, used for searching the virtual resource information storing unit for the identifier of the virtual resource, and returning the location information calculated by the location information calculating unit if the identifier of the virtual resource is found.

A further illustrative embodiment provides a terminal device used for searching a location of a virtual resource in a data computing system. The data computing system comprises a plurality of servers, each server being coupled with a sensor, the sensors consisting of a communication network, and at least one server being deployed with the virtual resource. The terminal device comprises a virtual resource searching request input unit, used for inputting a searching request for a virtual resource, the searching request containing an identifier of the virtual resource; a communication unit, used for communicating with at least one sensor of the plurality of sensors and for sending the searching request to the sensor; a location information calculating unit, used for calculating the location of the terminal device; a path calculating unit, used for calculating a path from the location of the terminal device to the virtual resource, based on location information of the virtual resource returned by the sensor; and a display unit, used for displaying path information calculated by the path calculating unit.

DETAILED DESCRIPTION

The specific embodiment will be described in connection with the figures.

Figure 2:
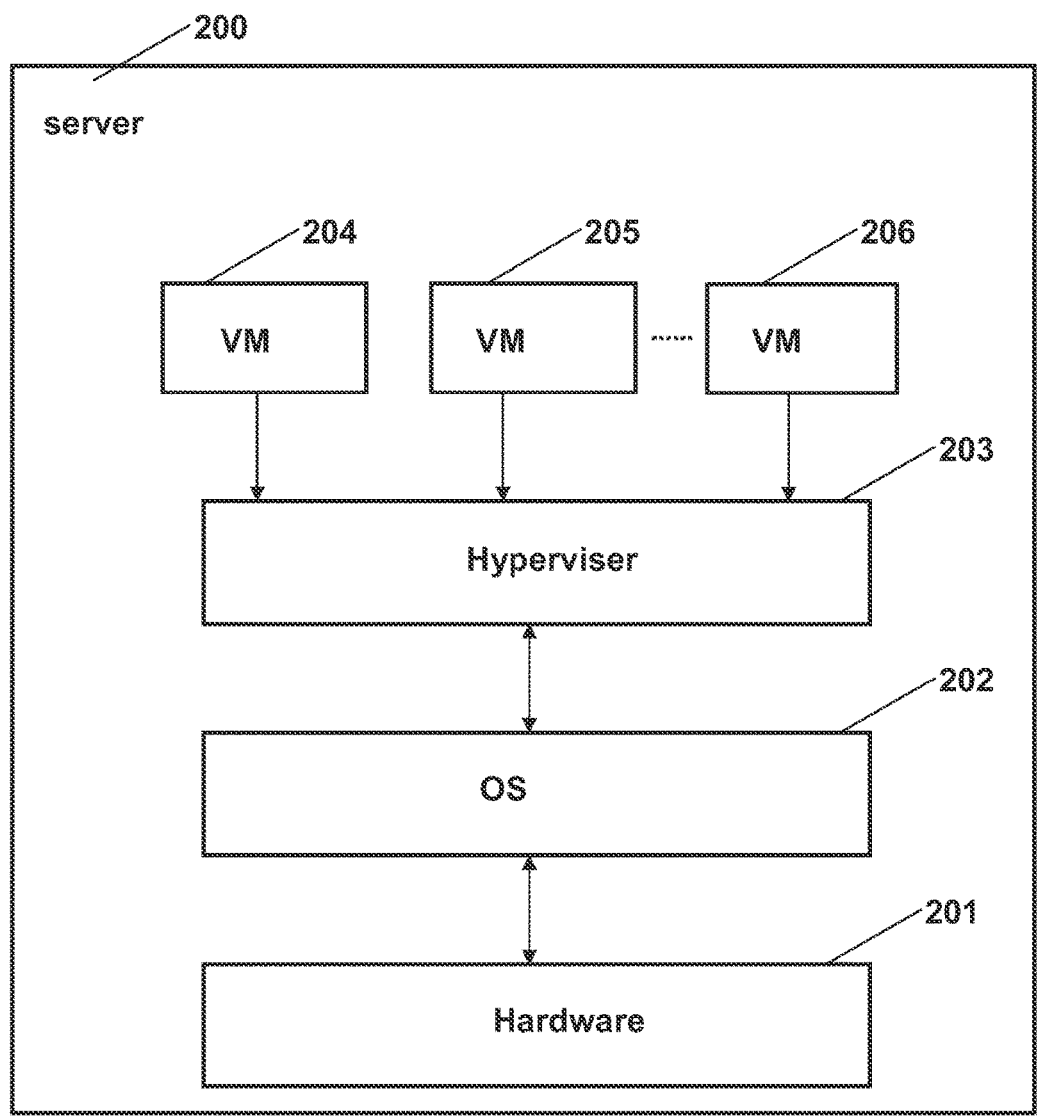
FIG. 2 shows a virtual machine deployed on a physical server.

FIG. 2 shows a conventional physical server 200 and virtual machines 204-206 deployed on the server.

The physical server 200 as shown in FIG. 2 has hardware 201, operating system 202, hypervisor 203 and a plurality of virtual machines 204, 205, 206.

The hardware 201 may include conventional central processing unit (CPU), memory, input/output (I/O) interface, bus, etc. Further, hardware providers also develop various hardwares supporting virtual machines, for example, AMD-V, Alcatel-Lucent 3B20D/3B21D, IBM System/370, System/390®, zSeries® mainframes, Sun Microsystems.

The operating system 202 could be various known operating systems, for example, Solaris Zones, Linux™ OS, FreeBSD™ OS, etc. (SYSTEM/390 and ZSERIES are registered trademarks of International Business Machines Corporation in the United States and other countries. LINUX is a trademark of Linus Torvalds in the United States and other countries. FREEBSD is a trademark of the FreeBSD Foundation.)

Hypervisor 203 is an application program for managing a plurality of virtual machines (VM). Even though the hypervisor 203 and operating system 202 shown in FIG. 2 are separate, in certain operating systems that directly support virtual machines, the hypervisor 203 could be implemented in the operating system 202.

The plurality of virtual machines 204-206 could be system virtual machines (system VM), which is designed to support the execution of a complete operating system. An example of the system virtual machine is Solaris Containers. Alternatively, virtual machines 204-206 could be a process virtual machine (process VM), which is designed to run a single program so as to support a single process. For example, an example of process virtual machine is Java™ Virtual Machine. An essential characteristic of a virtual machine is that the software running inside is limited to the resources and abstractions provided by the virtual machine—it cannot break out of its virtual world. Virtual machines 204-206 could be dynamically created, eliminated, moved and combined, etc. (JAVA is a trademark of Oracle and/or its affiliates.)

It should be noted that the term "virtual machine" in the present description shah be widely construed as any virtual resources (i.e., soft resources) deployed on a physical server, for example, a plurality of operating system or user spaces deployed on the same physical server, a web service program, a file transfer protocol (FTP) service program, an email service program or other programs providing various services or agents deployed on a physical server.

Hypervisor 203 manages the creation, elimination, movement of virtual machines 204-206, allocates and release resources for virtual machines 204-206, and keeps track of the status of every virtual machine. For example, when a virtual machine is created, hypervisor 203 allocates one unique identifier VMID for this virtual machine so as to identify this virtual machine. If desired by users, hypervisor 203 can also allocate various resources for each created virtual machine, the resources including for example a memory occupying certain space, a number of computing units, how many bits the CPU operates (for example, 32-bit or 64-bit), I/O throughput, etc. When a virtual machine 204 is to be eliminated, hypervisor 203 releases the allocated resources. When a virtual machine 204 is moved from one physical server to another physical server, the original physical server releases the resources for this virtual machine 204, the new physical server allocates new resources for this virtual machine 204. According to one embodiment, when a virtual machine 204 is eliminated, its allocated identifier VMID will be preserved and will not be used by any newly created virtual machine. According to another embodiment, when a virtual machine 204 is moved from one physical server to another physical server, this new physical server will allocate a new VMID for this virtual machine, rather than using the original VMID. By this manner, it is guaranteed that there is a one-to-one corresponding relationship between a VMID and a virtual machine 204.

Figure 3:
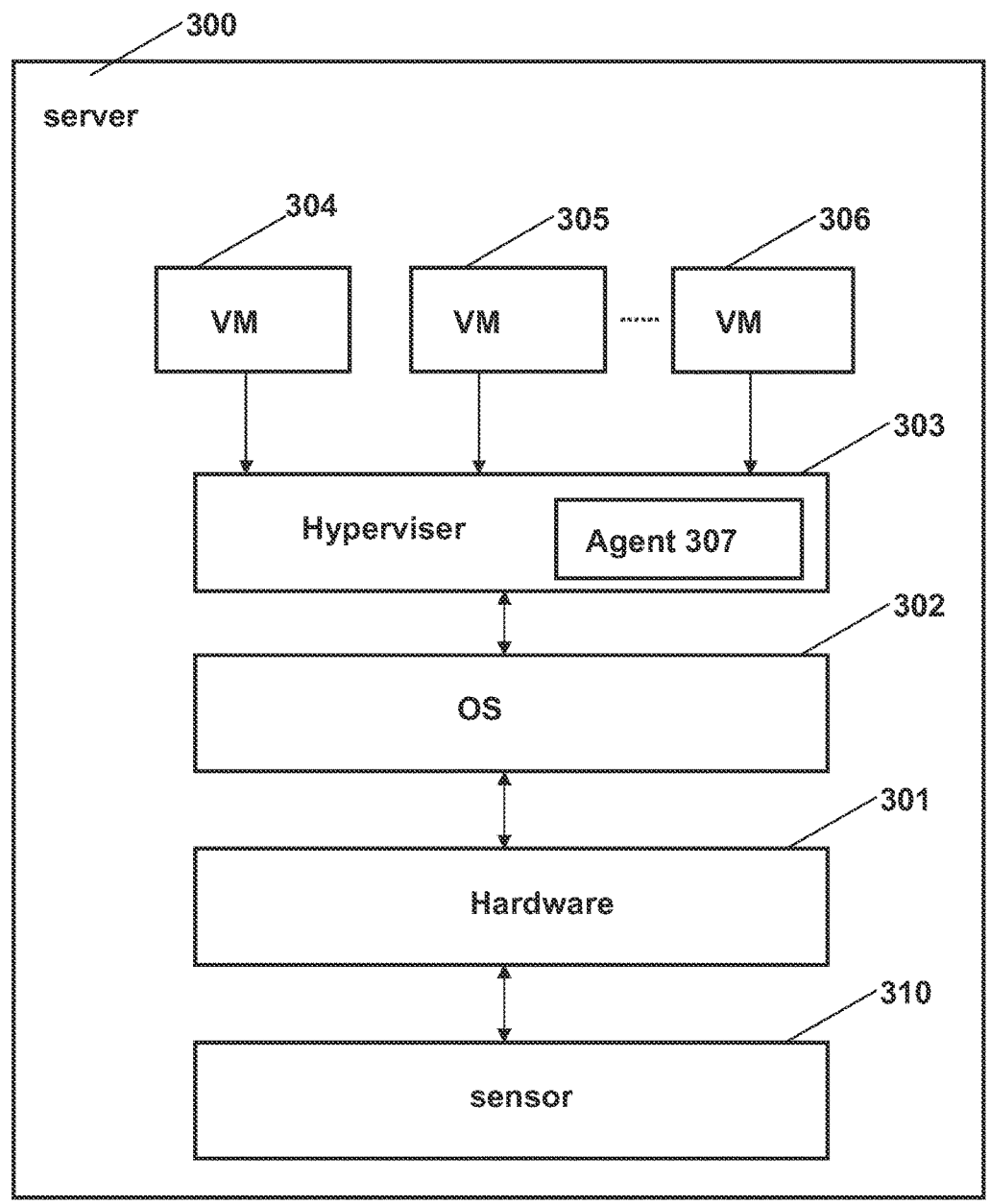
FIG. 3 shows an example of a physical server that deploys a virtual machine and a sensor according to an illustrative embodiment.

FIG. 3 shows an example of a server deploying virtual machines and a sensor according to an illustrative embodiment.

The server 300 as shown in FIG. 3 includes hardware 301, operating system 302, hypervisor 303, a plurality of virtual machines 304-306 and a sensor 310.

As shown in FIG. 3, the hardware 301, operating system 302, hypervisor 303, a plurality of virtual machines 304-306 are substantially identical with the hardware 201, operating system 202, hypervisor 203, a plurality of virtual machines 204-206 of FIG. 2. The details thereof will be omitted.

The sensor 310 of FIG. 3 is used to obtain information of virtual machines 304-306 in the server 300. Specifically, an agent 307 is provided in the hypervisor 303. The agent 307 is used to monitor and maintain the related information of virtual machines 304-306 in the server 300, and send the stored related information of virtual machines 304-306 to the sensor 310. The sensor 310 can communicate with the hardware 301 and obtain the related information of virtual machines 304-306 sent by the agent 307. According to a preferred embodiment, the sensor 310 can periodically send a request to the agent 307 to obtain the latest information of the virtual machines.

According to a preferred embodiment of the present invention, the sensor 310 can interact with the hardware 301 in a wireless manner. Alternatively, the sensor 310 can also interact with the hardware 301 in a wired manner.

It should be noted that although in the embodiment shown in FIG. 3, the sensor 310 is implemented as a component of the server 300, the illustrative embodiments are not limited by this. In an alternative embodiment, the sensor 310 and the server 300 are separately implemented. The sensor 310 can be fixed to the server 300, and interacts with the server 300 via wireless communication techniques.

Figure 4:
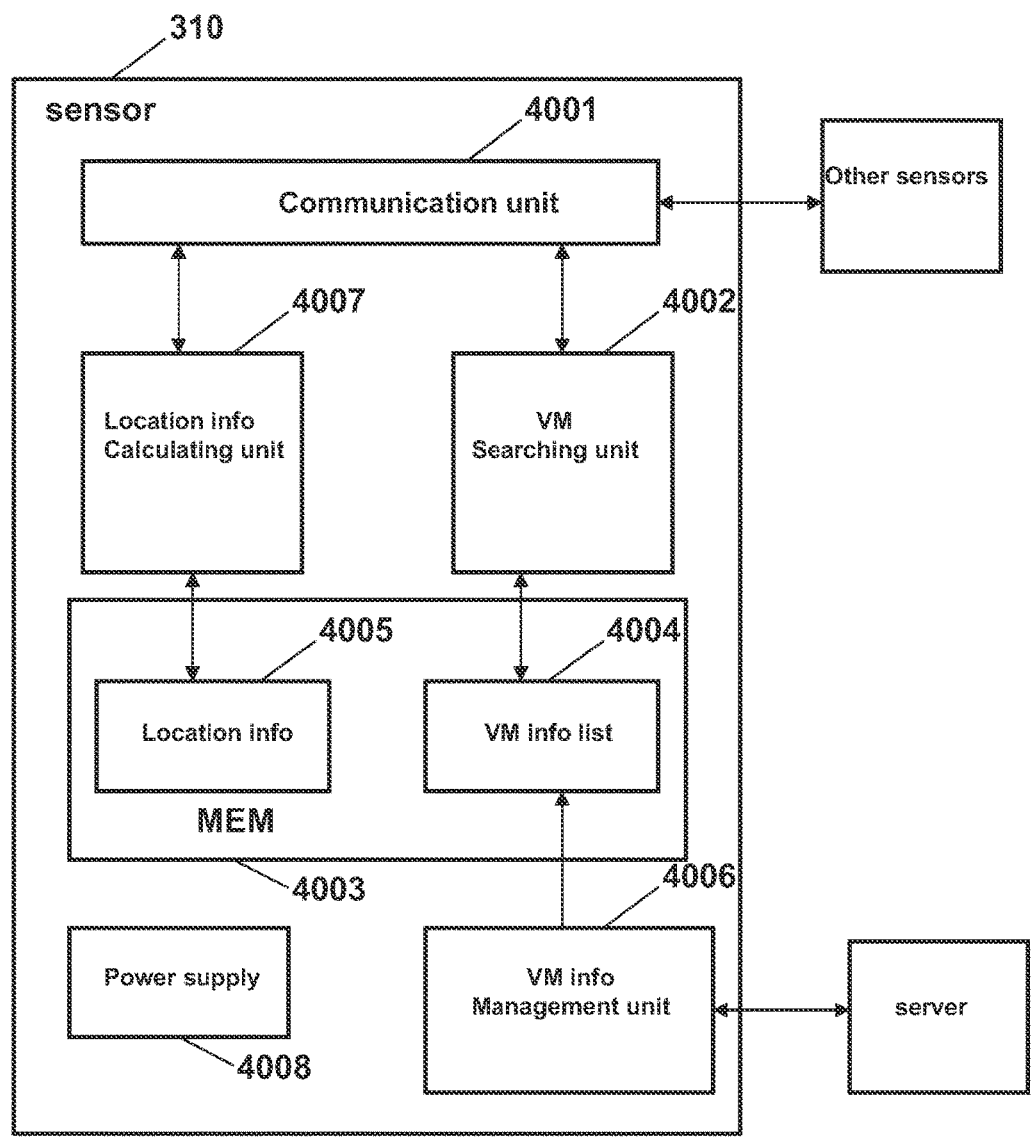
FIG. 4 shows the structure of the sensor according to an illustrative embodiment.

FIG. 4 shows the basic structure of the sensor 310.

The sensor 310 as shown in FIG. 4 includes a communication unit 4001, a virtual machine information searching unit 4002, a memory 4003, a virtual machine information acquiring unit 4006, a location information calculating unit 4007, and a power supply unit 4008. The communication unit 4001 is used to communicate with other sensors. According to one example embodiment, a plurality of sensors 310 consist of a wireless ad hoc communication network. The wireless ad-hoc network is a self-organized and decentralized wireless network. The location of each node can be dynamically changed, and the layout of the whole network will change accordingly. Each node of the wireless ad hoc network can forward data for other nodes so as to obtain the whole network connectivity.

It shall be noted that the plurality of sensors 310 can consist of an independent network via the plurality of communication units 4001. Even if the server 300 deploying the sensor 310 has a problem, it will have no negative effect on the intercommunication between the sensors 310.

The sensor 310 and the sensor network thereof as shown in FIG. 4 can be realized using the known commercial available sensor products. For example, the sensor of the illustrative embodiment can be realized based on the sensor product MICA2® developed by Crossbow Corp. Further, CAS (Chinese Academy of Sciences) and HIT (Harbin Institute of Technology) also develop related sensor products. Of course, those skilled in the art can use other sensor products that can be applied to the illustrative embodiments.

Figure 5:
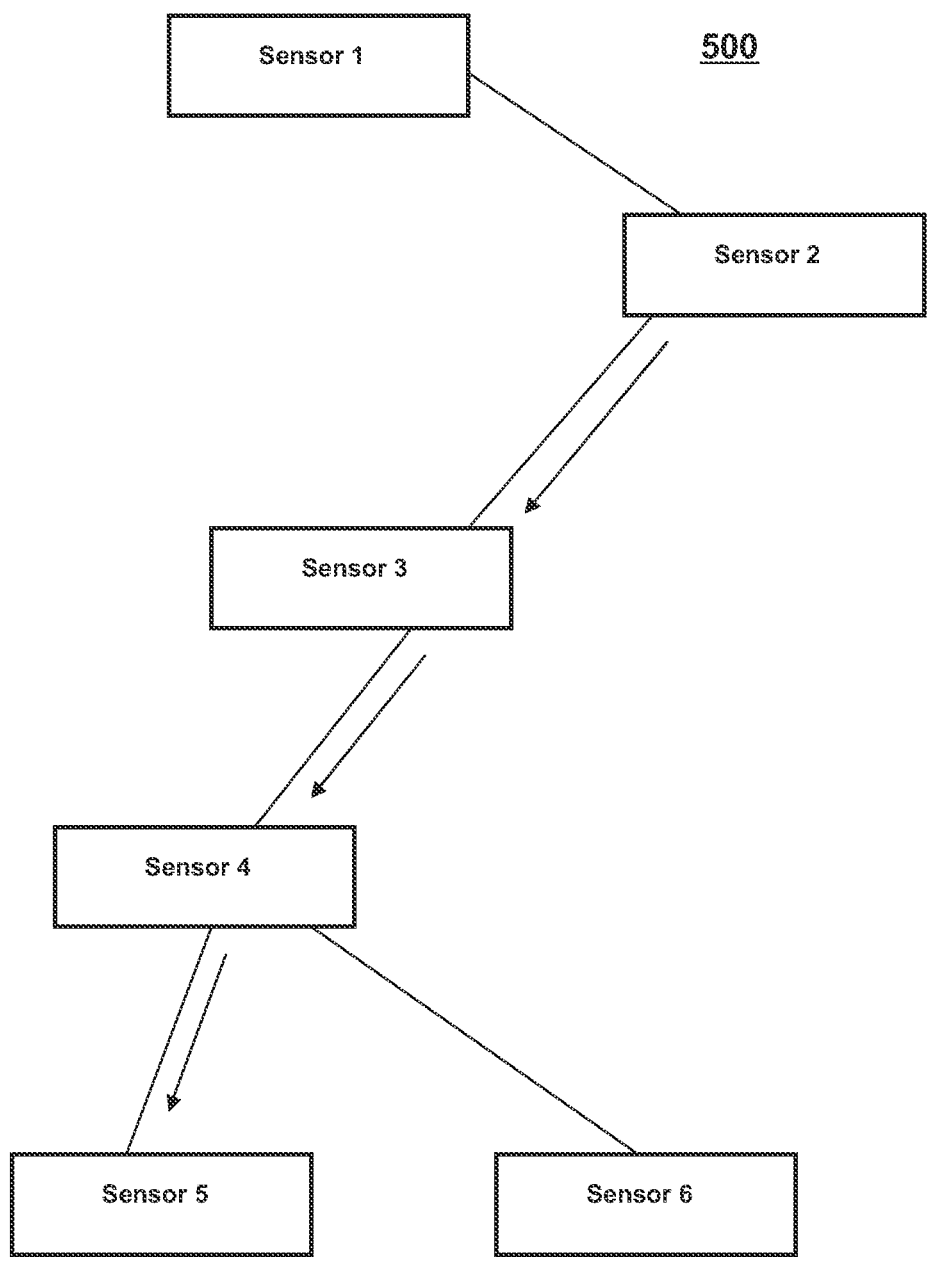
FIG. 5 shows an example sensor network consisting of the sensors according to an example embodiment.

FIG. 5 shows an example ad-hoc network 500 consisting of a plurality of sensors 310 via the communication units 4001.

The sensor network 500 shown in FIG. 5 comprises sensors 1-6. The network 500 is self-adaptive, i.e., to be re-constructed according to the movements of nodes. By one or more nearby nodes forwarding messages, the source sensor can send/receive message to any target sensor. For example, when sensor 2 sends a message to sensor 5, the routing path could be: sensor 2-sensor 3-sensor 4-sensor 5.

Ad-hoc wireless network supports various routing algorithms to realize the communication between the nodes within the network. For example, On-demand Routing Algorithm includes Multirate Ad-hoc On-demand Distance Vector Routing Protocol; Proactive routing algorithm includes AWDS (Ad-hoc Wireless Distribution Service), HSR (Hierarchical State Routing protocol) etc.; Adaptive Routing Algorithm can also be used.

Preferably, the ad-hoc network used by the illustrative embodiment can be a wireless mesh network (WMN). The WMN is a special ad-hoc wireless network, wherein the nodes are organized as a communication network like a mesh. The nodes in WMN can be notepads, mobile phones or other wireless devices, for example, sensors. The WMN can be realized using various communication protocols, for example, including 802.11, 802.16, etc. or the combination thereof. It shall be noted that the sensor network 500 of the illustrative embodiment is not limited to any special type of network, as long as it can provide intercommunication between sensors.

Referring to FIG. 4, the sensor 310 includes a virtual machine information acquiring unit 4006 to manage the information of virtual machines. Specifically, the virtual machine information acquiring unit 4006 communicates with the agent 307 (referring to FIG. 3) in the server 300 to acquire the information of virtual machines 304-306 in the server 300. The virtual machine information acquiring unit 4006 stores the acquired virtual machine information in a memory 4003. The memory 4003 stores a virtual machine information list 4004, which stores related information of all the virtual machines in the server 300 corresponding to the sensor 310.

Figure 6:
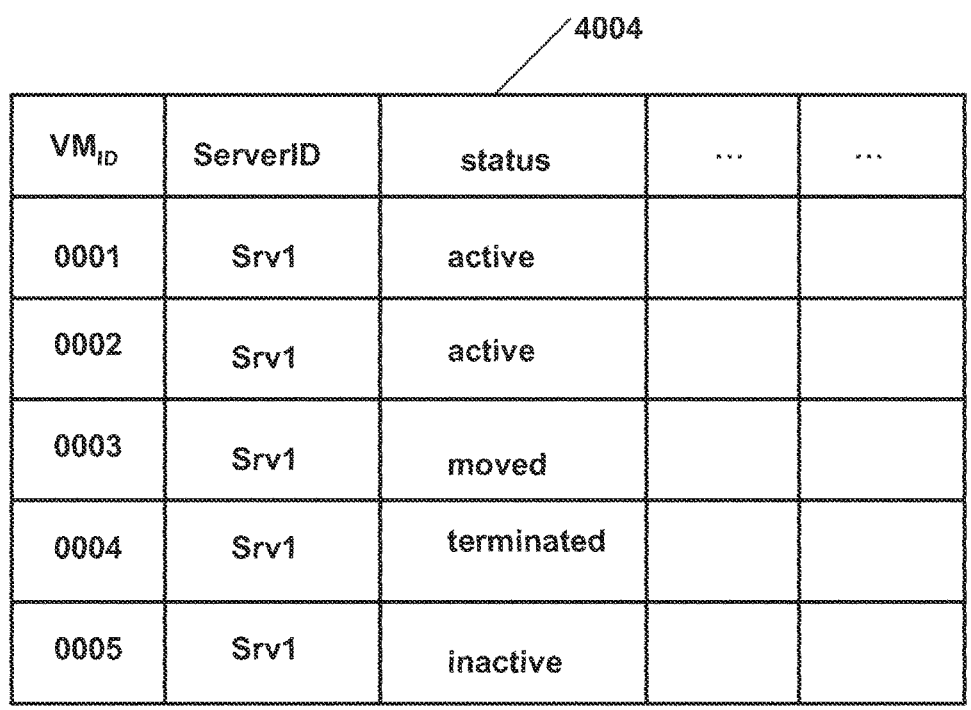
FIG. 6 shows an example of a virtual machine information list in accordance with an illustrative embodiment.

FIG. 6 shows an example of a virtual machine information list 4004.

As shown in FIG. 6, VMID is an index of the virtual machine information list 4004. The VMID can be defined by the manager. For sake of simplicity, in the present embodiment, FIG. 6 shows the five identifiers VMID are 0001, 0002, 0003, 0004 and 0005. It shall be noted that the composition of VMID is not limited to numbers of a decimal system, but also numbers of a hexadecimal system, or letter or other characters and the combination thereof. Further, the length of VMID can be adjusted if desired. For example, according to the number of the physical servers deployed in a data center, the length of VMID is set to guarantee every virtual machine will be allocated a unique identifier. Further, if the VMID cannot be recycled, that is, when one virtual machine is eliminated, its VMID is maintained, the space of VMID will still be sufficient.

FIG. 6 also shows the attributes corresponding to the VMID. For example, the ServerID (Srv1) in the first column is identifiers of servers, used for identifying the server (Server 1) corresponding to the VMID. The Status in the second column a status identifier, used for identifying the present status of the virtual machine. For example, the status can include any of the following: Active, Terminated, etc. The Active status indicates that this virtual machine is still resident and operates on this physical server. The Terminated status indicates that this virtual machine is already removed from this physical server.

The above are merely examples of status of virtual machines in the virtual machine information list 4004. Those skilled in the art will understand the other status of virtual machines could be defined as required by specific applications.

For example, according to an alternative embodiment, it is further defined an Inactive status, indicating that the status of certain virtual machine cannot be monitored. The Inactive status can be used to indicate the situation when a problem occurs in a virtual machine or a physical server. It is assumed that the sensor 310 periodically sends a request to the server 300 to search the latest status information of virtual machines, if there is a problem in the physical server 300 (for example, the physical server is shut down), then the sensor 310 cannot obtain any information of virtual machines being resident in this physical server 300. After a predetermined time elapses, or after a predetermined number of requests, if the information of virtual machines is still not available, the sensor 310 will set the status of all virtual machines in this physical server 300 as Inactive. Similarly, when certain virtual machine has a problem (not being terminated normally), the sensor 310 will set the status of this virtual machine as Inactive.

According to an alternative embodiment, a Moved status is further defined for virtual machine in the virtual machine information list 4004. The Moved status indicates that this virtual machine is already moved from this physical server to another server. Further, the related information of the target server to which the virtual machine is moved can be stored in the virtual machine list 4004, for example, the identifier of the target server, the new identifier VMID allocated for this virtual machine after it has been moved, etc. In practice, if the manager is not interested in the location of a Moved virtual machine or a Terminated virtual machine, the information of Moved virtual machine and Terminated virtual machine can be deleted from the virtual machine information list 4004 in order to save memory space.

It shall be noted that the above descriptions are merely examples of the virtual machine information list 4004. The virtual machine information list 4004 can be extendable. Users can store further detailed information in the virtual machine information list 4004 if necessary, including the virtual machine creation time, the user of the virtual machine, the resources occupied by the virtual machine, the priority levels of the virtual machine, etc.

According to the illustrative embodiment, in order to locate the location of virtual machines, the virtual machine information list 4004 shall at least indicate whether one virtual machine is resident on a corresponding physical server or not. Therefore, by merely searching the index VMID of the virtual machine information list 4004, it is known whether one virtual machine is on a physical server or not.

Referring to FIG. 4 again, the sensor 310 also includes a virtual machine information acquiring unit 4006.

The virtual machine information acquiring unit 4006 communicates with the server 300 that the sensor 310 is connected with, receives information of virtual machines 304-306 from the server 300. Preferably, the virtual machine information acquiring unit 4006 of the sensor 310 wirelessly communicates with the server 300.

The virtual machine information acquiring unit 4006 can passively receive data sent by the agent 307 in the server 300. Alternatively, the virtual machine information acquiring unit 4006 can voluntarily send a request to the server 300 for related information of virtual machines. The virtual machine information acquiring unit 4006 can also periodically send requests to the server 300, and write information of virtual machines returned by the server 300 into the virtual machine information list 4004, so that the virtual machine information list 4004 can maintain the updated information of all virtual machines, including the creation of new virtual machines, the elimination of old virtual machines, the movement of virtual machines, etc.

Referring to FIG. 4, the sensor 310 also includes a location information calculating unit 4007. The location information calculating unit 4007 is used for calculating and storing the location of the sensor 310 itself, in order to get the location of the server 300 comprising this sensor 310.

The conventional GPS locating techniques are not suitable for calculating the location of the sensor 310. This is because the illustrative embodiments are mainly used in a data center of large scale and high density. Firstly GPS locating techniques need to receive satellite signals, while the data center is deployed within a building, certain places in the building will probably have a bad QoS of signals and thus the GPS locating cannot work. Further, the precision provided by GPS locating is not sufficient to accurately calculate the location of the sensor 310. In a large scale data center, there might be thousands of servers 300 in a single rack. Thus, the distance between two adjacent servers 300 is quite small, so a locating technique of more precision is desired.

The location information calculating unit 4007 may use various methods to realize high precision locating within a building. For example, the principle of locating might be triangle measurement, single edge measurement, or multiple edge measurement. Further, depending on whether there is "anchor" or not, locating methods can be roughly divided into two groups: anchor-free algorithm and anchor-based algorithm. In the anchor-free algorithm, it is not necessary to preset location information, but to locate based on local distance values. The known methods of this anchor-free algorithm include for example AFL algorithms and ABC algorithms. The anchor-based algorithm relies on certain nodes that the coordinates thereof are already known. This anchor-based algorithm needs to preset a plurality of nodes in advance. The location information calculating unit 4007 calculates the location information of itself by calculating the strength of received signals, the arrival time difference of the received signals, or the arrival angles of the received signals estimated by antennas.

According to an example embodiment, a plurality of anchors (reference signal sources) are provided in the building where the data center is deployed, the location of the anchors are fixed and the coordinates thereof are known. The plurality of reference signal sources can cover sensor nodes within the whole building, so that each sensor receives signals from a plurality of reference signal sources, and calculates the precise location of itself by using the coordinates of the reference signal sources. In another alternative implementation, the reference signal sources needn't cover the whole building, so that the communication ranges of reference signal sources are reduced. Then, the precise location of sensors covered by reference signal sources are calculated firstly, location of other sensors can be then deduced.

The reference signal sources can also be realized as sensors 310 that are mounted at fixed and known locations.

It shall be noted that the illustrative embodiment is not limited to any specific method of locating the precise location of sensors 310. For example, the illustrative embodiment can use an anchor-free locating method, i.e., no fixed anchor is required. For further information about the distributed locating method in an ad-hoc wireless network, please refer to Distributed localization in wireless sensor networks: a quantitative comparison, Computer Networks 43 (2003) 499-518, Koen Langendoen, etc.

Although in the example shown in FIG. 4, each sensor 310 calculates its own location via a location information calculating unit 4007, that is, the calculation of location of sensors 310 is distributative. However, the illustrative embodiments are not limited to this. The location information of sensors 310 can be calculated concentratedly and externally, and then the calculation results will be sent to sensors 310.

After the location information calculating unit 4007 calculates the location of sensor 310, the location information calculating unit 4007 stores location information of sensor 310 in the memory 4003. The memory 4003 stores the location information input by the location information calculating unit 4007 into the location information storing unit 4005.

If the server 300 frequently moves, the location information calculating unit 4007 can periodically calculate location information. Thus, even if the sensor 310 moves together with the server 300, the location information storing unit 4005 still can store the updated location information of the sensor 310 and the server 300. On the other hand, if the server 300 does not move frequently, the location information calculating unit can calculate the location of the sensor 310 during initialization, or calculate the location of the sensor 310 upon receipt of an instruction (for example, a Reset instruction).

Although in the example shown in FIG. 4, the location information storing unit 4005 and the virtual machine information list 4004 are separately implemented, in an alternative embodiment, the location information storing unit 4005 and the virtual machine information list 4004 can be integrally implemented, that is, to store the location of the sensor 310 (i.e., the server 300) and the information of virtual machines stored in the sensor together. For example, an additional column can be added into the virtual machine information list 4004 shown in FIG. 6 to store the location calculated by the location information calculating unit 4007.

Referring to FIG. 4, the sensor 310 also includes a power supply unit 4008. According to an illustrative embodiment, the power supply unit 4008 is implemented as a battery, so that the sensor 310 has an independent power supply. Even if the server 300 is down, the sensor still can operate. On the other hand, the sensor 310 may have an external power supply interface to get power from an external power supply. For example, some server racks provide additional power supply sockets to be used by sensors 310.

Referring to FIG. 4, the sensor 310 also includes a virtual machine information searching unit 4002. The virtual machine information searching unit 4002 is coupled with the communication unit 4001, receives a searching request for certain target virtual machine (VMtarget) from the communication unit 4001. The virtual machine information searching unit 4002 is also connected with the memory 4003, and searches the target virtual machineVMtarget in the virtual machine information list 4004. If the target virtual machineVMtarget is found in the virtual machine information list 4004, a hit result is notified to the communication unit 4001. Then, the communication unit 4001 notifies the sensor that sent the searching request.

Figure 7:
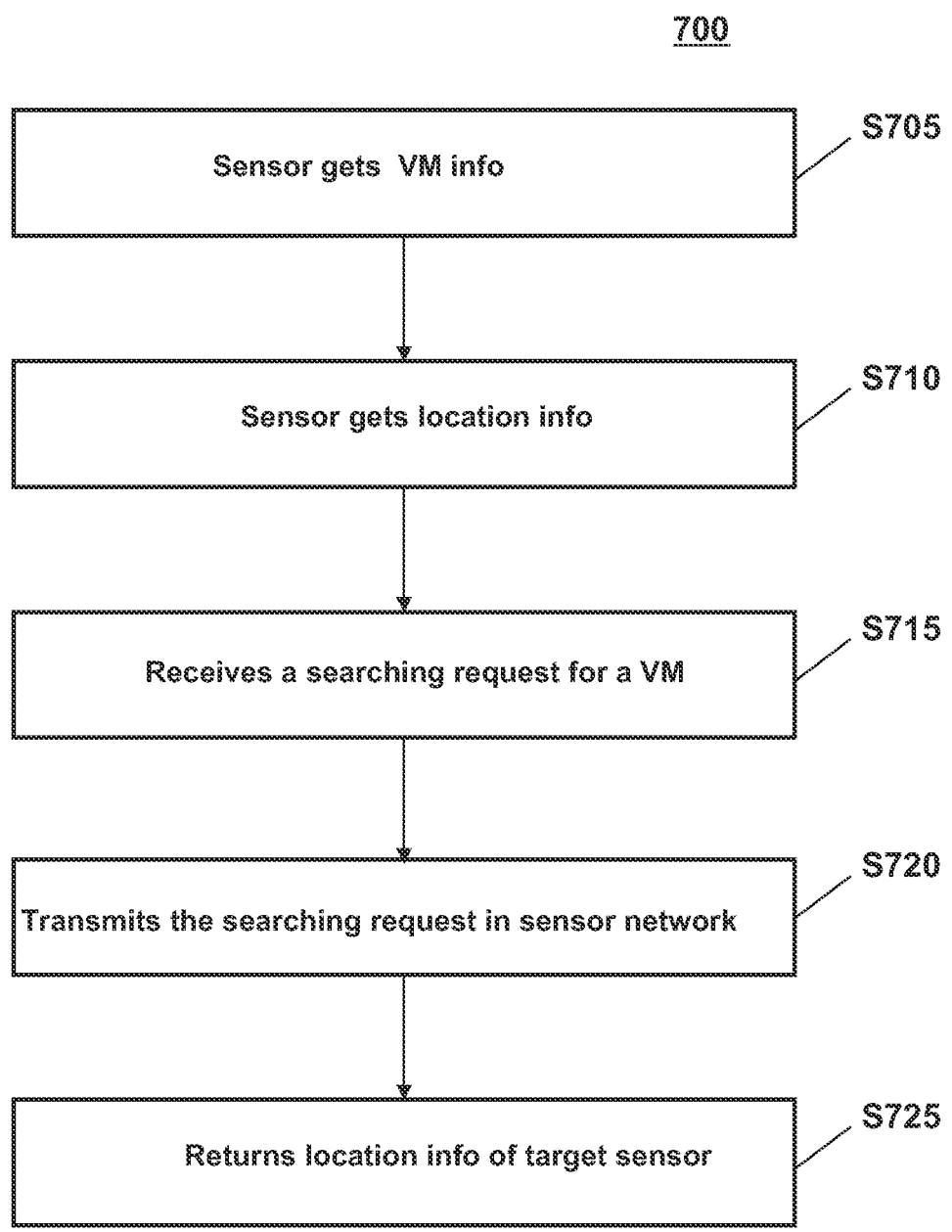
FIG. 7 shows an example of a flowchart of searching a virtual machine according to an illustrative embodiment.

FIG. 7 shows a flowchart 700 of the method of searching virtual machines according to one embodiment.

Figure 1:
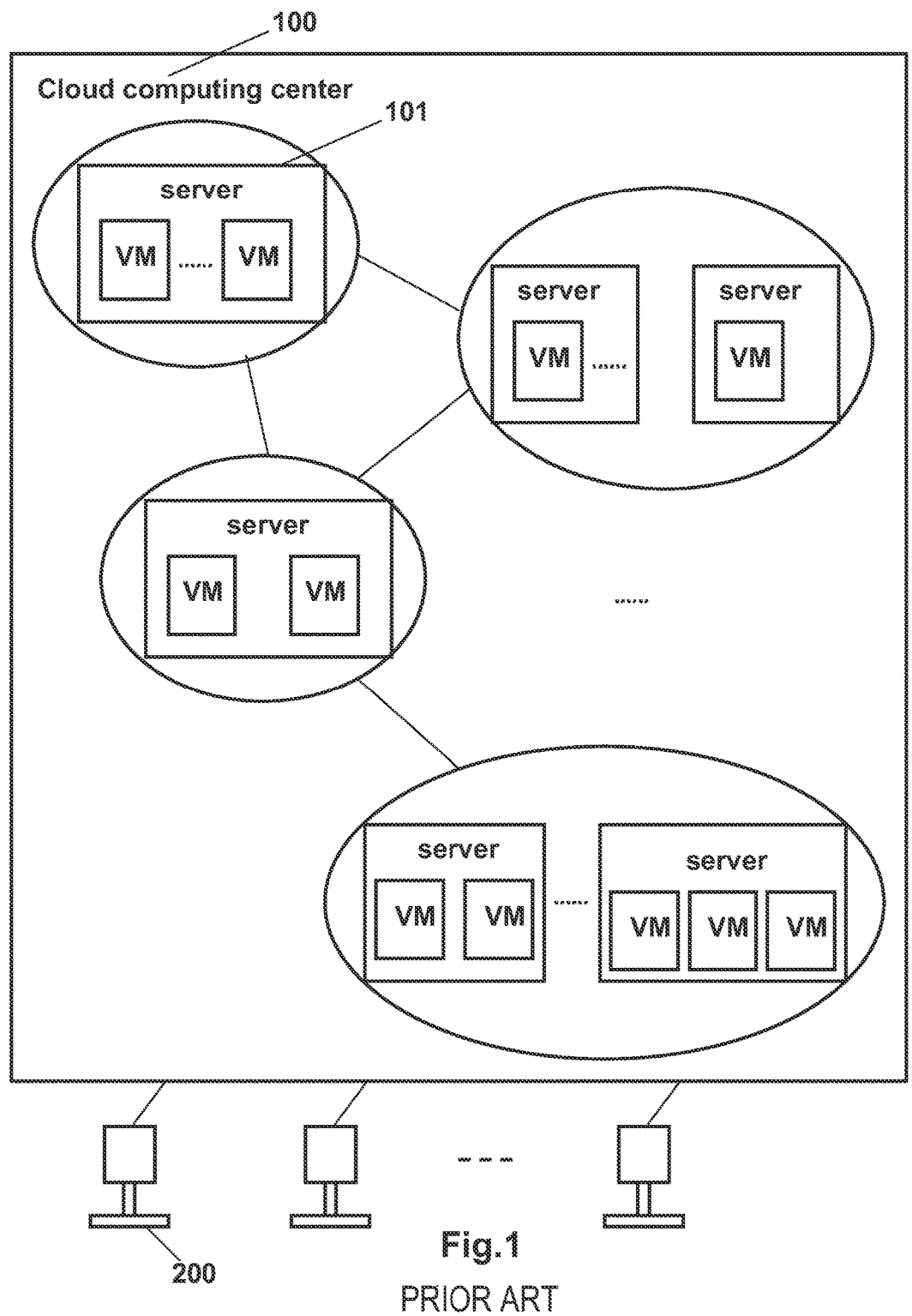
FIG. 1 shows an example of a cloud computing center.

As shown in FIG. 1, FIG. 3 and FIG. 5, a virtual machine is deployed on at least one server, and each server is attached with a sensor and communicate with it. The sensors communication with each other and consist of a communication network. The method 700 shown in FIG. 7 comprises the following steps:

At Step S705, the sensor acquires information of a virtual machine.

Specifically, each sensor 310 acquires information of one or more virtual machines deployed in a server 300 that is connected with this sensor. Referring to FIGS. 3-4, the sensor 310 communicates with the server 300 via the virtual machine information acquiring unit 4006, and acquires the related information of virtual machines deployed on the server 300.

At Step S710, the sensor acquires location information.

Specifically, each sensor 310 calculates and stores location information of this sensor. In the example of FIG. 4, the location information calculating unit 4007 calculates location of the sensor 310, and stores it in the location information storing unit 4005. Alternatively, location information is not calculated within respective sensor 310. Instead, it is calculated externally and concentratedly, and then is sent to the sensor 310.

According to one embodiment, the location of a physical server is not moved, and virtual machines are not dynamically created or moved, the Step S705, S710 are merely performed during initialization. In this case, the searching method begins at the following Step S715. According to another embodiment, locations of physical servers frequently change, and virtual machines are dynamically created, thus Step S705 and Step S710 are performed periodically to acquire the latest updated information.

At Step S715, the sensor receives a searching request, wherein the searching request contains an identifier (VMtarget) of the target virtual machine.

Figure 8:
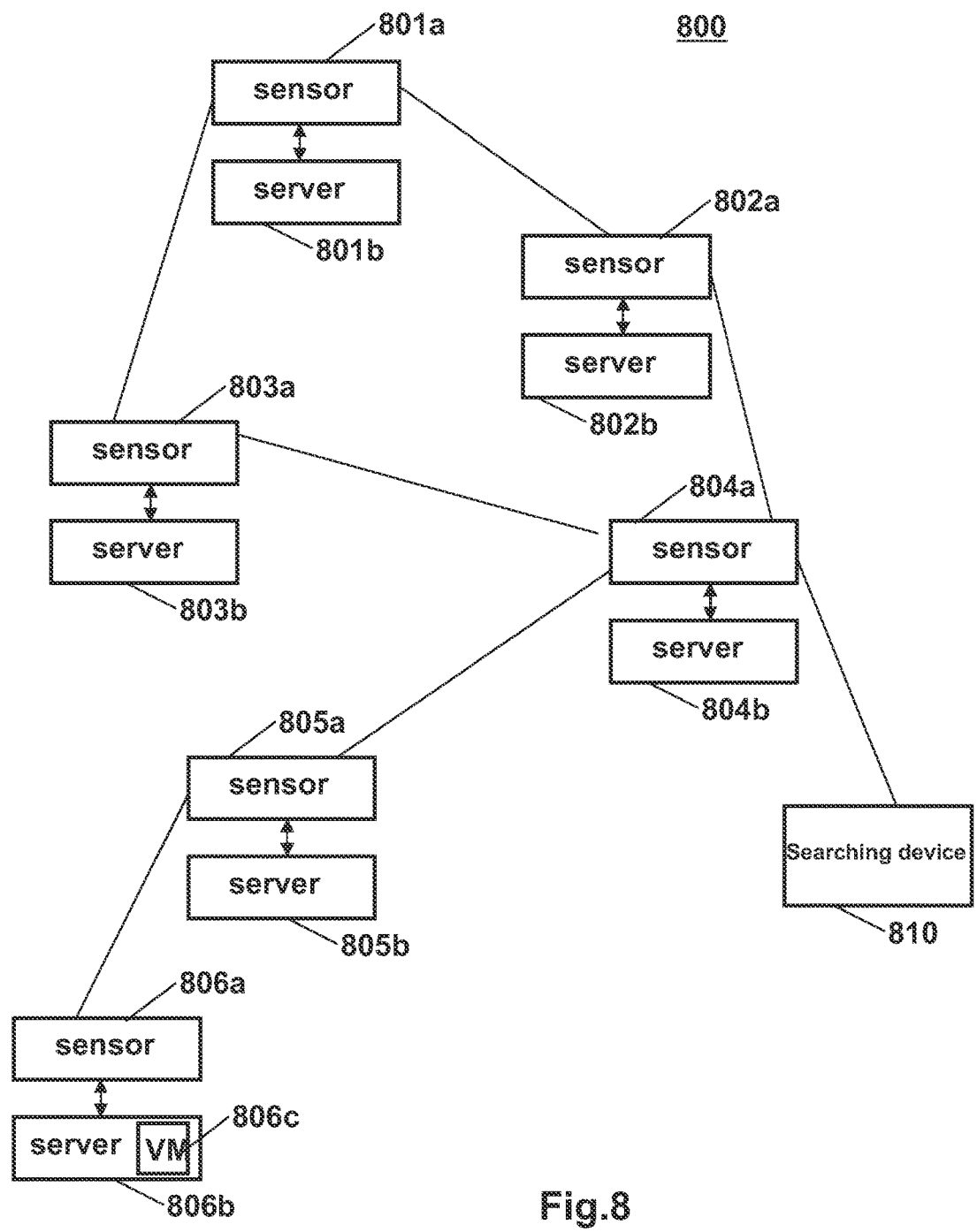
FIG. 8 shows an example of a system for implementing searching a virtual machine according to an illustrative embodiment.
Figure 9:
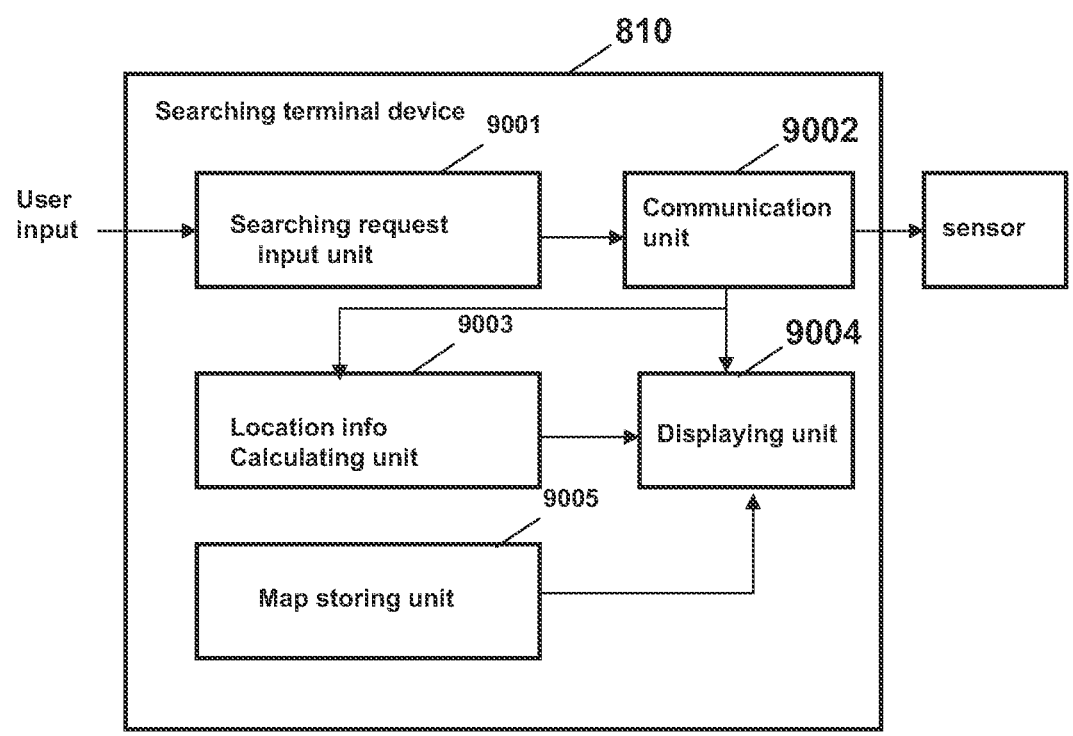
FIG. 9 shows an example of the structure of the searching device of the illustrative embodiments.

According to the illustrative embodiment, a searching device is provided (for further details refer to FIGS. 8-9). The searching device is used to provide an interface for inputting a searching request. The searching device can communicate with at least one sensor 310 and send a searching request to the sensor 310. The searching device can either be fixed to one place or be portable. When the searching device is portable, preferably, the searching device can calculate and display its own location.

At Step S720, the searching request is forwarded in the sensor network 500 consisting of the plurality of sensors 310.

There are a number of ways to forward or propagate a searching request in a sensor network 500. For example, when the sensor network 500 is an ad-hoc wireless network, each sensor searches its own virtual machine list after it receives a searching request, if there is no identifier of the target virtual machine, the searching request will be forwarded to adjacent sensors by broadcasting, so that the searching request can reach every sensor in the sensor network. It is simple to forward messages (e.g., searching request) via broadcasting, and it is also adapted to the situation where the topology of sensor network frequently changes. However, frequent broadcasting may cause the network traffic due to the flooding. Alternatively, when the topology of the sensor network is stable, the sensors can maintain routing information for routing to adjacent sensors, and forward searching requests to adjacent sensors according to a routing table.

At Step S725, the sensor, that stores the identifier of the target virtual machine, returns its own location information.

Specifically, after the sensor 310 receives a searching request, it searches in the virtual machine information acquired at Step S705, and when the target virtual machine is found, the sensor 310 returns the location information calculated at Step S710.

The location information can be returned to the sensor that firstly receives the searching request. The location information can be further returned to the searching device that input the searching request. The searching device has a display for displaying the location information.

FIG. 8 shows a system 800 for implementing searching virtual machines according to an illustrative embodiment.

The system 800 shown in FIG. 8 includes a plurality of sensors 801a, 802a, 803a, 804a, 805a, 806a and a plurality of servers 801b, 802b, 803b, 804b, 805b and 806b, each server is connected with a corresponding sensor. The system 800 of FIG. 8 further includes a searching device 810.

FIG. 9 displays the basic structure of a searching device 810 according to an illustrative embodiment.

The searching device 810 includes a searching request input unit 9001, a communication unit 9002, a location information calculating unit 9003, a path display unit 9004, a map storing unit 9005.

The searching request input unit 9001 is used to receive a VM location searching request from users (for example, a manager). The virtual machine location searching request contains an identifier of the target virtual machine.

The communication unit 9002 is used to communicate with the sensor.

Referring to Step S715 of FIG. 7, after the searching request input unit 9001 receives a virtual machine location searching request input by the user, it forwards it to the sensor via the communication unit 9002. For example, referring to FIG. 8, the virtual machine location searching request is transmitted to an adjacent sensor 804a. In the example shown in FIG. 8, the target virtual machine, for example, is the virtual machine 806c deployed on the server 806b.

Referring to Step S725 of FIG. 7, the location information of the sensor 806a that contains the virtual machine is returned to the sensor 804a that receives the searching request, and then the sensor 804a returns the location information to the communication unit 9002 of the searching device 810.

The display unit 9004 of the searching device 810 can display the location information received by the communication unit 9002.

According to one embodiment, the searching device 810 further includes a map storing unit 9005 used for storing a map of the whole data center. Thus, based on the location information and the map information, the display unit 9004 can display the location of the target virtual machine on the map of the whole data center.

According to one embodiment, the searching device 810 further comprises a location information calculating unit 9004. When the searching device 810 is not fixed to one place but is portable, the location information calculating unit 9004 calculates location of the searching device 810. Based on the location of the searching device, the location of the target virtual machine, the map information stored in the map storing unit 9005, the display unit 9004 calculates and displays a path from the pending location to the target virtual machine.

Preferably, the searching device 810 further comprises a prompting unit (Not shown in FIG. 9) used for sending a message to the sensor 806a that returns location of the target virtual machine, so that the sensor 806a presents an audible or a visual signal. This is because in a high density data center, there are probably hundreds of servers in a single server rack, even if the precise location of the target virtual machine (i.e., location of the server 806b) is acquired, it is still difficult to quickly locate which one of the hundreds of adjacent servers is the target server. By presenting an audible signal or other perceptible signal from the sensor 806a, it helps the manager quickly find out the target server 806b. Alternatively, it is also possible to make the target server 806b present an audible signal or other perceptible signals.

According to an alternative embodiment, the searching device can also be implemented as a sensor 310. That is, an additional input device is added to a sensor 310 so that a searching request is allowed to be inputted, and an additional display device is added to display location information.

Figure 10:
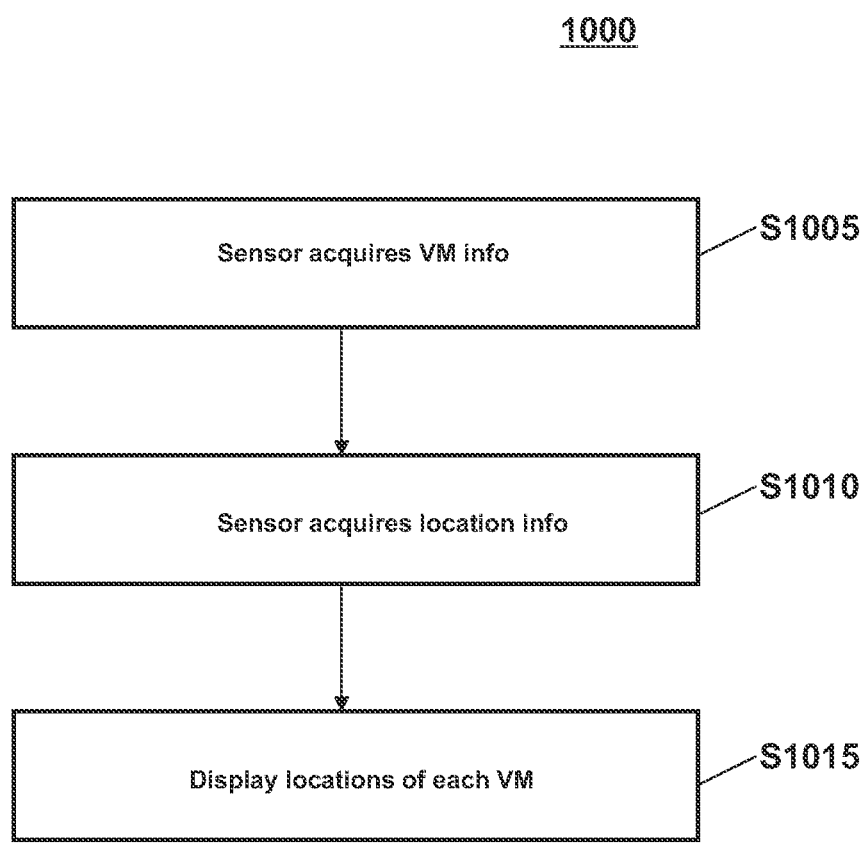
FIG. 10 shows an example of a flowchart of managing locations of virtual machines in a data computing system according to an illustrative embodiment.

FIG. 10 shows a method flow 1000 of the method for managing locations of virtual machines in a data computing system according to an illustrative embodiment, wherein the data computing system comprises a plurality of servers, at least one server is deployed with a virtual machine, and each server is attached with a sensor, the plurality of sensors consist of a sensor network, the method comprises the following:

At Step S1005, a sensor acquires information of a virtual machine.

Specifically, each sensor acquires and stores information of virtual machines deployed in a server that is connected with the sensor. For example, information of virtual machines is acquired from a server via the virtual machine information management unit 4006 shown in FIG. 4.

At Step S1010, a sensor acquires location information.

Specifically, each sensor computes and stores location information of the sensor itself. For example, location information is acquired via the location information calculating unit 4007 shown in FIG. 4.

At Step S1015, location information of each virtual machine is displayed.

Specifically, based on location information of each sensor and virtual machine information of each sensor, location of each virtual machine can be displayed.

Locations of virtual machines can be displayed in the display unit 9004 of the searching device 810 as shown in FIG. 9. When the searching device 810 comprises a map storing unit 9005, the display unit 9004 can display locations of all virtual machines on the map of the whole data center.

Preferably, each sensor stores information of virtual machines in the sever that is connected to the sensor, the information further includes information indicating at least one of the following status of virtual machines: active, terminated, moved, inactive, etc, as shown in FIG. 6. Thus, when locations of respective virtual machines are displayed in the searching device 810, status information of corresponding virtual machines can also be displayed.

The above descriptions are based on FIG. 1-10 and describe mechanisms for searching and displaying locations of virtual machines in a large scale data center.

It shall be noted that the mechanisms of the present invention are not limited to searching locations of virtual machines, but also applicable to searching other soft and hard resources in a data center. For example, if other application program is deployed on a server, the information of this application can be acquired by the sensor, and then the location of the application can be acquired. Therefore, the term "virtual machine" in this description shall be construed in its widest meaning, i.e., any virtual resources deployed on a physical server. For example, it can be a web server, an ftp server, an email server or other applications that provides services or agents deployed on a physical server. For example, the sensor can acquire identifiers of various applications (for example, web service, ftp service, email service, etc.) deployed on a physical server that is connected with the sensor, wherein the manager of the data center will allocate a unique identifier for respective applications.

Further, the illustrative embodiments can be used to search locations of a physical server, or search locations of other hardware (for example, a printer) coupled with a server.

It shall be noted that there are a number of ways to implement the method, device and system of the illustrative embodiments. For example, the mechanisms of the illustrative embodiments can be implemented via software, hardware, firmware or any combination thereof. The specific order that the steps of the method are described is merely for explanations and shall not be construed as a restriction, unless it is specifically defined in other ways. Further, in certain embodiments, the present invention can be implemented as programs that are recorded on a recording medium. These programs include machine readable instructions for implementing the method according to the present invention. Therefore, the present invention also covers a recording medium that stores programs for executing the method of the present invention.

Though the present invention is described in details in combination of certain specific embodiments, those skilled in the art will understand that the above examples are merely for purpose of explanations and shall not be construed as any restriction of the present invention. It should be understood by those skilled in the art that various modifications, combinations, sub-combinations and alterations may occur depending on design requirements and other factors insofar as they are within the scope of the appended claims or the equivalents thereof.

The invention claimed is:

1. A sensor hardware device for mounting on a server, the server being deployed with a deployed virtual resource, the sensor comprising:
   a communication unit, wherein the communication unit communicates with communication units of other sensor hardware devices so that the sensor hardware device and other sensor hardware devices form a communication network, and wherein the communication unit receives a searching request for a requested virtual machine, the searching request containing an identifier of the requested virtual machine;
   a location information calculating unit, wherein the location information calculating unit dynamically calculates and stores location information of the sensor hardware device, wherein the location information is calculated based on a detected current location of the sensor hardware device relative to the locations of the other sensor hardware devices in the communication network;
   a virtual machine information acquiring unit, wherein the virtual machine information acquiring unit communicates with the server where the sensor hardware device is mounted and acquires an identifier of the deployed virtual machine deployed on the server;
   a virtual machine information storing unit, wherein the virtual machine information storing unit stores the identifier of the deployed virtual machine acquired by the virtual machine information acquiring unit; and
   a virtual machine information searching unit, wherein the virtual machine information searching unit searches the virtual machine information storing unit for the identifier of the requested virtual machine, and returns the location information calculated by the location information calculating unit if the identifier of the requested virtual machine is found.

2. The sensor hardware device of claim 1, wherein the communication units communicate by an Ad-Hoc wireless communication protocol.

3. The sensor hardware device of claim 1, wherein the virtual machine information storing unit further stores information indicating status of the deployed virtual machine from at least one of the following statuses: active, inactive.

4. The sensor hardware device of claim 1, wherein the location information calculating unit of the sensor hardware device calculates the location information by receiving signals from a plurality of reference signal sources.

5. The sensor hardware device of claim 1, wherein if the identifier of the requested virtual machine is not found, the sensor hardware device forwards the searching request in the communication network of sensor hardware devices and returns a location information of an identified sensor hardware device storing the identifier of the requested virtual machine by the identified sensor hardware device.

6. The sensor hardware device of claim 1, wherein the sensor hardware device returns the location information, receives a message instructing the sensor hardware device to produce an audible signal or a visible signal, and produces an audible signal or a visible signal according to the received message.

7. A data computing system, comprising:
a plurality of servers, at least one server being deployed with a deployed virtual machine; and
a plurality of sensor hardware devices, wherein each given sensor hardware device is mounted on a corresponding server and comprises:
a communication unit, wherein the communication unit communicates with communication units of other sensor hardware devices so that the given sensor hardware device and other sensor hardware devices form a communication network, and wherein the communication unit receives a searching request for a requested virtual machine, the searching request containing an identifier of the requested virtual machine;
a location information calculating unit, wherein the location information calculating unit dynamically calculates and stores location information of the given sensor hardware device, wherein the location information is calculated based on a detected current location of the sensor hardware device relative to the locations of the other sensor hardware devices in the communication network;
a virtual machine information acquiring unit, wherein the virtual machine information acquiring unit communicates with its corresponding server where the given sensor acquires an identifier of a deployed virtual machine deployed on the corresponding server;
a virtual machine information storing unit, wherein the virtual machine information storing unit stores the identifier of the deployed virtual machine acquired by the virtual machine information acquiring unit; and
a virtual machine information searching unit, wherein the virtual machine information searching unit searches the virtual machine information storing unit for the identifier of the requested virtual machine, and returns the location information calculated by the location information calculating unit if the identifier of the requested virtual machine is found.

8. The data computing system of claim 7, wherein the communication units communicate by an Ad-Hoc wireless communication protocol.

9. The data computing system of claim 8, wherein the virtual machine information storing unit further stores information indicating status of the deployed virtual machine from at least one of the following statuses: active, inactive.

10. The data computing system of claim 7, wherein the location information calculating unit of the given sensor hardware device calculates the location information by receiving signals from a plurality of reference signal sources.

11. The data computing system of claim 7, wherein if the identifier of the requested virtual machine is not found, the given sensor hardware device forwards the searching request in the communication network of sensor hardware devices and returns a location information of an identified sensor hardware device storing the identifier of the requested virtual machine by the identified sensor hardware device.

12. The data computing system of claim 7, wherein the given sensor hardware device returns the location information, receives a message instructing the given sensor hardware device to produce an audible signal or a visible signal, and produces an audible signal or a visible signal according to the received message.

13. The data computing system of claim 7, further comprising:
a searching terminal device that calculates and displays a path to the given sensor hardware device returning the location information.

14. A server data processing system, comprising:
at least one central processing unit;
an operating system running on the at least one central processing unit;
a hypervisor that manages one or more virtual machines deployed on the server data processing system; and
a sensor hardware device,
wherein the sensor hardware device communicates with other sensor hardware devices so that the sensor hardware device and other sensor hardware devices form a communication network and receives a searching request for a requested virtual machine, the searching request containing an identifier of the requested virtual machine;
dynamically calculates and stores location information of the sensor hardware device, wherein the location information is calculated based on a detected current location of the sensor hardware device relative to the locations of the other sensor hardware devices in the communication network;
acquires an identifier of a deployed virtual machine within the one or more virtual machines deployed on the server data processing system;
stores the identifier of the deployed virtual machine in a virtual machine information storing unit;
searches the virtual machine information storing unit for the identifier of the requested virtual machine; and
returns the location information calculated by the location information calculating unit if the identifier of the requested virtual machine is found.

15. The server data processing system of claim 14, wherein the hypervisor provides an agent that monitors virtual machines deployed in the server data processing system.

16. The server data processing system of claim 15, wherein the sensor hardware device acquires the identifier of the deployed virtual machine deployed on the server data processing system from the agent.

17. The server data processing system of claim 14, wherein the sensor hardware device stores information indicating a status of the deployed virtual machine from at least one of the following statuses: active, inactive.

18. The server data processing system of claim 14, wherein if the identifier of the requested virtual machine is not found, the sensor hardware device forwards the searching request in the communication network of sensor hardware devices and returns a location information of an identified sensor hardware device storing the identifier of the requested virtual machine by the identified sensor hardware device.

19. The server data processing system of claim 14, wherein the sensor hardware device returns the location information, receives a message instructing the sensor hardware device to produce an audible signal or a visible signal, and produces an audible signal or a visible signal according to the received message.

\* \* \* \* \*